June 22, 1943.                C. J. STUART                2,322,402
LOCKING MECHANISM
Filed Aug. 5, 1942
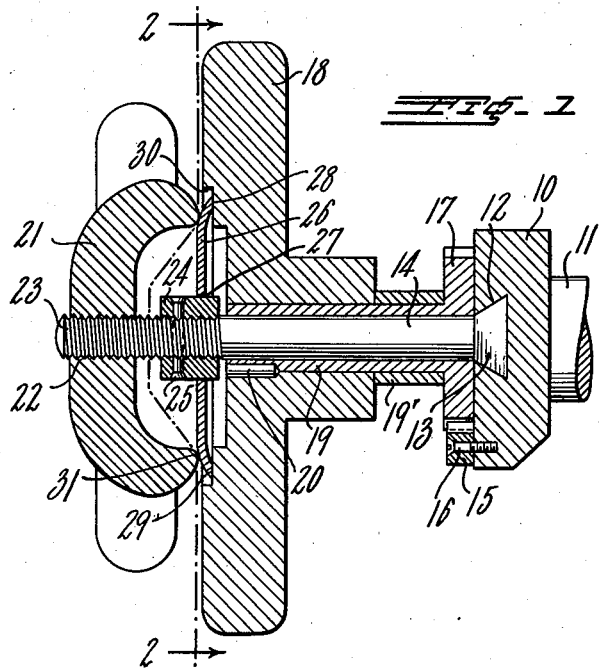
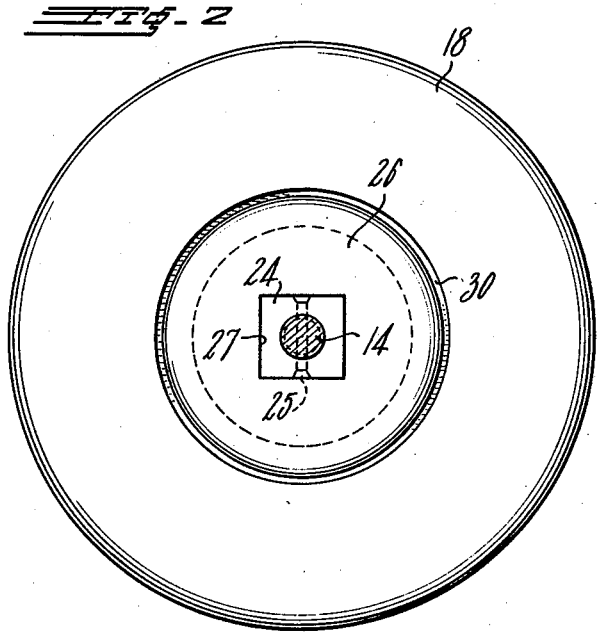
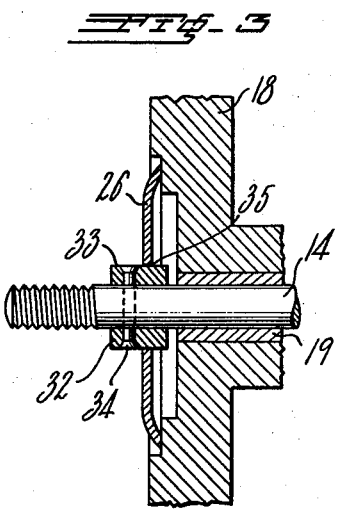
INVENTOR.
CHARLES J. STUART
BY
Lester J. Budlong
ATTORNEY Patented June 22, 1943

2,322,402

UNITED STATES PATENT OFFICE 2,322,402

LOCKING MECHANISM

Charles J. Stuart, Winchester, Mass., assignor to Wellman Company, Medford, Mass., a corporation of Maine Application August 5, 1942, Serial No. 453,689

3 Claims. (Cl. 287—53)

This invention relates to an improved mechanism for locking a rotatable member on a shaft, and particularly to the means for preventing the rotation of one of the locking members.

The invention is an improvement upon the locking adjustment disclosed in my co-pending application Serial No. 364,964, filed November 9, 1940, comprising an adjusting hand wheel rotatably mounted on a shaft, a manually operable locking member, and a locking disc non-rotatably mounted on a shaft between the hand wheel and the manually operable locking member. The non-rotatable locking disc is adapted to be clamped by the locking nut between and in frictional engagement with the locking nut and the hand wheel to prevent the latter from rotating after an adjustment has been made by turning the hand wheel. The purpose is to provide a secure and releasable locking mechanism. This improvement consists primarily in the simplified construction of the locking disc and the means for non-rotatably mounting the disc on the shaft.

The invention will be described in detail in connection with the accompanying drawing, in which:

Fig. 1 is a longitudinal cross-sectional view of the locking mechanism embodying the invention;

Fig. 2 is a sectional view on line 2—2 of Fig. 1; and

Fig. 3 is a fragmentary cross-sectional view of a modified form of the invention.

The invention is illustrated herein in connection with a mechanism for changing the eccentricity of a crank pin on a crank disc. The crank disc 10 is rotated by a shaft 11. The disc 10 is provided with a dovetail groove 12, in which is slidably mounted a head 13 of the crank pin, or shaft 14. A rack 15 is secured to the crank disc 10 by means of screws 16. The pin 14 may be moved along the groove 12 to adjust its eccentricity in respect to the shaft 11 by means of a pinion 17 rotatably mounted on the crank pin 14, and meshing with the teeth of the rack 15. The pinion 17 is operated by a hand wheel 18 keyed to the sleeve 19 of the pinion 17 by a key 20. Rotatably mounted on the sleeve 19 between the pinion 17 and the hand wheel 18 is a crank pin block 19' forming the connection with a member to be operated by the crank pin 14, which construction is more particularly shown in United States Patent No. 1,270,319 in Fig. 5 by member 55.

The hand wheel 18 is locked in any desired position by a manually operable member, or locking nut 21, having a threaded internal bore 22 cooperating with the threaded portion 23 of the crank pin 14.

As shown in Fig. 1 a nut 24 is screwed onto the threaded portion 23 and is keyed thereto by a pin 25 passing diametrically through the nut and the crank pin 14. As shown in Fig. 2, the nut 24 has non-circular outer walls, and as specifically shown the walls are square. A spring cup-shaped locking disc 26 is provided with a central opening 27 conforming to the shape of the outer walls of the nut 24, and it is slidably and non-rotatably mounted on the outer walls of the nut 24, the non-circular walls being adapted to prevent rotation. The outer perimeter 28 of the locking disc 26 is provided with frictional surfaces which contact with the frictional surface 29 located in a recess 30 on the hand wheel 18. The locking nut 21 is provided with a frictional surface 31 having a radius substantially equal to the radius of the frictional surface on the outer perimeter of the locking disc 26 and located a substantial distance from its axis of rotation so as to provide a relatively long lever arm for the frictional forces to act upon. When the locking nut is turned so as to move its frictional surface 31 in contact with the locking disc 26, the frictional surface 28 on the disc is moved in contact with the frictional surface 29 on the hand wheel 18.

When the locking nut 21 is turned down tight, the hand wheel 18 is frictionally locked against rotation on the crank pin 14 by the friction between the surface 29 on the hand wheel 18 and the non-rotatable frictional surface 28 on the locking disc 26. Since the radii of the frictional surfaces 28, 29, and 31 are relatively long the wheel 18 is securely locked in place as well as the locking nut 21, and it requires a relatively large torque force to rotate the hand wheel 18 and loosen the locking nut 21 when it is in its locking position.

In the modification of the invention shown in Fig. 3 the locking disc 26 is locked against rotation on the shaft 14 by means of a bushing 32 having non-circular outer walls 33. The bushing 32 is keyed to the non-threaded portion of the shaft 14 by means of a pin 34. The locking disc 26 is provided with a central opening 35 which conforms to the shape of the outer walls 33 of the bushing 32 and is slidably and non-rotatably mounted thereon. The locking disc cooperates with the hand wheel 18 and is operated by the locking nut 21 in the same manner as shown in Fig. 1.

The construction of the locking discs 26 and the nut 24, or bushing 32 is advantageous because the disc can be easily stamped out and a standard nut or bushing may be used. A saving of metal and some machining of the metal parts is effected.

The preferred forms of this invention have been described and it will be understood that changes in the details may be made without departure from the spirit of the invention and the scope of the appended claims.

Having thus described my invention, what I claim and desire to protect by Letters Patent is:

1. A mechanism for locking an adjusting member against rotation on a shaft comprising threads on one end of said shaft and an enlarged anchoring base on the other end, a locking nut cooperating with said threads, a member having non-circular outer walls adapted to pass over said threads, means for fixing said non-circular member against movement on said shaft between said adjusting member and said nut, a locking disc having a central opening adapted to slidably fit and to be held against rotation by the non-circular walls of said member fixed on said shaft, said disc having its peripheral surface adapted to contact with said adjusting member, and said locking nut being adapted to be screwed against said disc to move its peripheral surface into frictional engagement with said adjusting member.

2. A mechanism for locking an adjusting hand wheel against rotation on a shaft comprising threads on the end of said shaft and an enlarged anchoring base on the other end, a locking nut cooperating with said threads, a member having non-circular outer walls adapted to pass over said threads, means for fixing said non-circular member against movement on said shaft between said hand wheel and said nut, a spring locking disc having a central opening adapted to slidably fit and to be held against rotation by the non-circular walls of said member fixed on said shaft, said disc having its peripheral surface adapted to contact with said wheel, and said locking nut being adapted to be screwed against said disc near its outer periphery to move its peripheral surface into frictional engagement with said wheel.

3. A mechanism for locking an adjusting hand wheel against rotation on a shaft comprising threads on the end of said shaft, a locking nut cooperating with said threads, a second nut having non-circular outer walls screwed on said threads and keyed to said shaft between said hand wheel and said locking nut, a spring locking disc having a central opening adapted to slidably fit and to be held against rotation by the non-circular walls of said second nut, said disc having its peripheral surface adapted to contact with said wheel, and said locking nut being adapted to be screwed against said disc to move its peripheral surface into frictional engagement with said wheel.

CHARLES J. STUART.